United States Patent [19]

Trauth et al.

[11] Patent Number: 4,906,912
[45] Date of Patent: Mar. 6, 1990

[54] APPARATUS FOR CONTROLLING THE LOAD ANGLE OF A CONVERTER

[75] Inventors: Gerhard Trauth, Erlangen; Leonhard Reng, Herzogenaurach, both of Fed. Rep. of Germany

[73] Assignee: Siemens Aktiengesellschaft, Berlin and Munich, Fed. Rep. of Germany

[21] Appl. No.: 326,520

[22] Filed: Mar. 21, 1989

[30] Foreign Application Priority Data

Mar. 28, 1988 [DE] Fed. Rep. of Germany ....... 3810502

[51] Int. Cl.$^4$ .............................................. H02P 5/40
[52] U.S. Cl. ..................................... 318/809; 318/800
[58] Field of Search .......... 318/800, 803, 805, 807-811

[56] References Cited

U.S. PATENT DOCUMENTS 4,158,801  6/1979  Hirata ................................. 318/809
4,330,741  5/1982  Nagase et al. ...................... 318/809
4,338,559  7/1982  Blaschke et al. .................... 318/803

Primary Examiner—David Smith, Jr.
Attorney, Agent, or Firm—Kenyon & Kenyon

[57] ABSTRACT

In order to feed to the converter on the load side of an intermediate-link frequency converter a frequency control signal (fI(S)*) which is formed by means of an angle controller (RW) from the difference of an angle reference value (wi(F)*) and a corresponding actual value (wI(F)), an actual value of the phase current is required which, for stable operation, must not contain heavy harmonics in stable operation nor must not be damped excessively dynamically by smoothing. Therefore, the measured actual angle value (wI(S)) is fed as the reference value of a servo controller (RS), to the output of which the integral (wI(S)*) of the frequency control quantity is added and the output of which is fed back to the input of the servo controller (RS).

4 Claims, 2 Drawing Sheets

APPARATUS FOR CONTROLLING THE LOAD ANGLE OF A CONVERTER

BACKGROUND OF THE INVENTION

The present invention relates to apparatus for controlling the load angle of a converter with a three-phase output.

A preferred field of application is the operation of a frequency converter-fed rotating-field machine with phase angle control for the stator currents. The frequency converters used advantageously have a d-c input, the d-c current of which is regulated or controlled to a reference value for the amplitude of the frequency converter output currents. Such an arrangement is shown in FIG. 1, as is described in DE-OS 29 19 852.

With respect to FIG. 1, the rotating-field machine M (an asynchronous machine in this case) is connected to an inverter WR on the machine side, the d-c inputs of which are connected to a rectifier GR on the network side via an intermediate d-c link. This rectifier GR on the network side is controlled by a control unit STR, the control voltage of which is connected to a current controller RI for the amplitude I of the output currents or the intermediate link d-c current. The corresponding reference current value I* can be taken off via a function generator FG at the output of a speed controller RN. In DE-OS 29 19 852, it is described that the output signal of the speed controller RN is proportional to the tangent of the load angle, i.e., proportional to the quotient of the components of the stator current perpendicular and parallel to the flux. This is therefore a signal similar to an angle which, for a given flux (i.e., for a predetermined reference value for the stator current component parallel to the field) is the reference value wI(F)* for the angle between the stator current vector and the flux vector of the machine. An actual value computer CAL forms an actual value wI(F) which is fed to the actual-value input 1 (negative input of summing stage) of an angle controller RW. The reference value input 2 (positive input of summing stage) of the angle controller is connected to the output of the speed controller RN (in the general case, an input device for an angle-like reference value). The output of the angle controller RW is connected to the frequency control input 3 of the control unit STW which controls the frequency converter WR on the machine side.

The known actual-value controller is connected via 3/2 converters to measuring devices MI and MU which measure the voltage and the current of the machine and form therefrom the components of the corresponding voltage vectors and current vectors in a reference system referred to the stator. The actual-value computer CAL comprises a flux computer CAL F which calculates the direction of the flux axis, i.e., practically the angle wF(S) between the flux axis and the stator axis, and on the other hand the flux-parallel component of the stator current vector. The components of the stator current vector parallel and perpendicular to the flux axis to be calculated can then be formed from the output signals of the current measuring device MI and the quotient of the two stator current components practically determines the angle wI(F). This angle wI(F) is therefore equal to the angular difference between the angle wI(S), which the stator current vector impressed by the frequency converter WR encloses with the stator axis, and the calculated angle wF(S) between the calculated field axis and the stator axis. It represents the actual value of the angle controller RW.

Considering only the angles, the known actual-value computer operates according to the principle shown in FIG. 1:

A measuring member MW for the angle wI(S), i.e., an angle detector, forms the actual angle value wI(S) for the phase of the frequency converter output currents which is referred to the stator axis. Since the reference angle value wI(F)* of the angle controller RW is referred to the flux axis, i.e., the reference angle wF(S), the actual value wI(S) and the reference value wI(F)* must be referred by a suitable phase shifting member to a common reference value (in this case, the phase of the flux). A subtraction member could therefore serve as the phase shifting member PH, which forms the difference wI(S) - wF(S) between the actual angle value wI(S) and the reference value wF(S).

To the speed controller RN must be connected, besides the reference speed value, a suitably determined actual speed value. In DE-OS 29 19 852, the frequency control variable fI(S)* is fed back as a substitute actual value for the speed from the frequency control input 3 of the control unit STW for the frequency converter WR on the machine side. By the switching processes in the frequency converter WR, however, pulse-like currents are fed to the stator winding in order to distribute at high frequency, the d-c current I impressed by the rectifier GR at equidistant points in time to different combinations of the three-phase inputs of the machine. At low frequencies, the individual phase currents are pulsed with a different duty cycle. In the block diagram of the control unit STW, this is indicated by the provision that the frequency control signal fI(S)* is integrated in an integrator INT to form a corresponding control signal WI(S)* for the stator referred phase angle which is impressed on the stator currents via the frequency converter WR by means of pulse width modulation (modulator MOD). The pulse-like stator currents, however, bring about that the actual angle value wI(S) is rich in harmonics, especially in pulsed operation at low frequencies. This is a disadvantage particularly if digital control without determination of the speed is used. Also in other cases it may become necessary to filter out the high frequencies in the actual angle value wI(S), where the required smoothing must be set very high in many cases in order to arrive at stable operation. This, however, degrades the desired large dynamic range of the angle control circuit considerably.

SUMMARY OF THE INVENTION

It is an object of the present invention to make available for the phase angle controller RW of a frequency converter with frequency and phase-controlled output current, an actual value largely free of harmonics.

The above and other objects of the invention are achieved by an apparatus for controlling the load angle of a converter with a-c output, especially for supplying a rotating-field machine, having an angle detector which forms an actual angle value for the phase of the frequency converter output currents, an angle controller, the actual-value input of which is connected to the angle detector, and to the reference value input of which an angle reference value is fed, and a control unit with a frequency control input which is connected to the output of the angle controller and the output signal of which controls the frequency converter, further comprising an angle follower which is connected between the angle detector and the actual-value input of the angle controller and comprises a servo control with an integral portion, to the reference value input of which the actual angle value is supplied and an adding stage to which are supplied the output signal of the servo control and an angle pilot control signal which is formed from the output signal of the angle controller and corresponds to the integral of the frequency converter frequency, and the output of which is connected to the actual value input of the servo control and the actual-value input of the angle controller.

BRIEF DESCRIPTION OF THE DRAWINGS

The invention will be described in greater detail in the following detailed description with reference to the drawings, in which.

DETAILED DESCRIPTION

Figure 1:
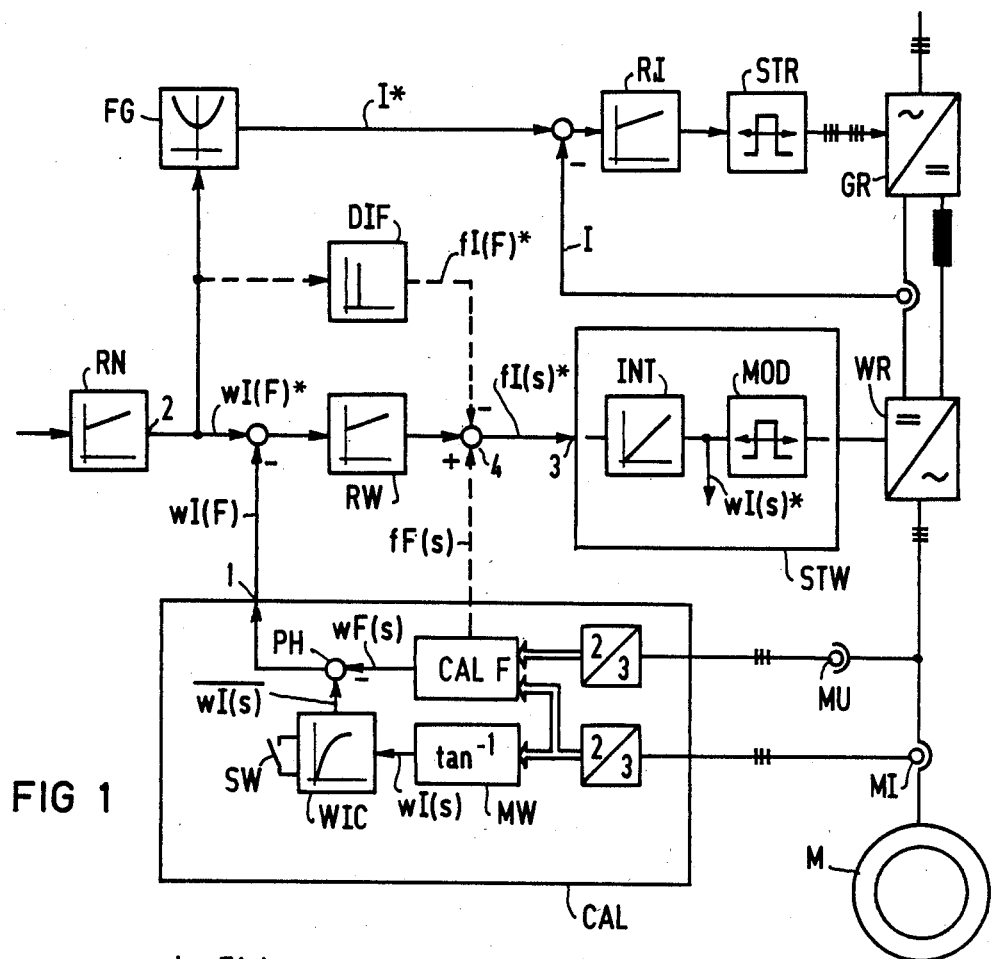
FIG. 1 shows a circuit for phase angle control including improvements according to the invention.

Between the phase detector MW and the actual value input 1 of the phase angle controller RW, a smoothing member is therefore arranged which is shown in general in FIG. 1 and is designated with WIC.

It is the purpose of the smoothing member WIC to determine the fundamental $\overline{wI}(S)$ of the actual angle value wI(S) also if harmonics are superimposed on the actual value, the amplitudes of which can reach the amplitude of the fundamental. The smoothing member must therefore cause heavy smoothing, for instance, with a smoothing constant definitely above 5 msec. In spite of this, a large dynamic range of the angle control is to be achieved and the fundamental $\overline{wI}(S)$ of the actual angle value is to be determined with the correct phase, at least in the steady-state case.

Figure 3:
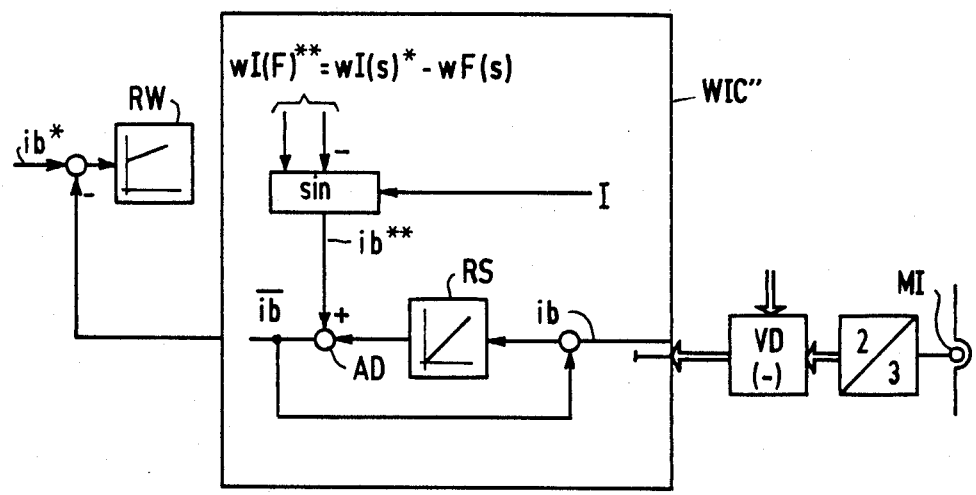
FIG. 3 shows a circuit for a Cartesian controller.
Figure 4:
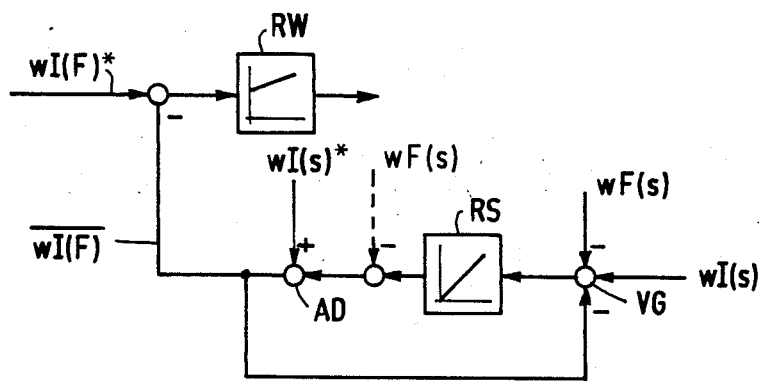
FIG. 4 shows another embodiment of the controller of FIG.3.

According to the invention an electronic observer is provided as the smoothing stage in order to simulate a substitute actual angle $\overline{wI}(S)$ free of harmonics which follows the control angle wI(S)* of the current with a phase shift dI(S) which corresponds to the response delay of the inverter WR. The latter depends on the operating state (for instance, the frequency) of the inverter and effects a phase difference between the fundamental of the current and its control angle, i.e., a finite mean value for the difference angle wI(S)-wI(S)*. The simulated phase shift dI(S) can therefore be determined by means of an angle follower for the actual substitute angle $\overline{wI}(S)=wI(S)*+dI(S)$, which contains a piloted servo-control and compensates the difference angle wI(S)−$\overline{wI}(S)$. Preferred embodiments of these angle followers are shown in FIGS. 2 to 4.

Figure 2:
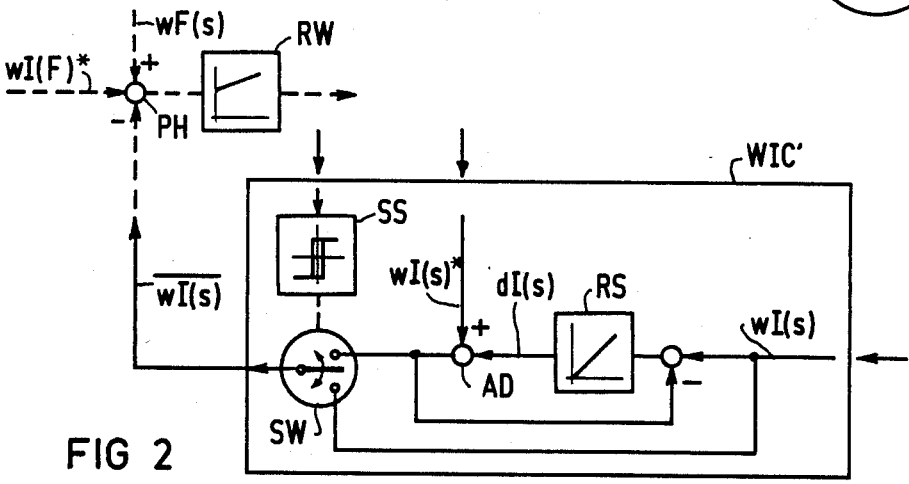
FIG. 2 shows a circuit embodying an angle follower controller according to one invention.

According to FIG. 2, the actual angle value wI(S) determined as the reference value by the phase detector MW is fed to an integral controller RS or to a controller which in any case contains a substantial integral component and and the fed-back controller output as the actual value. In case of a change of the frequency control signal fI(S)* and a corresponding change of wI(S)*, the controller RS would itself require a certain amount of time until its fed-back output signal dI(S) at the controller input no longer generates a difference angle. This control process is enhanced quite substantially by an adding stage AD, to which the output signal dI(S) and the signal wI(S)* are fed and the output signal of which is fed back on the one hand to the actual-value input of the controller RS and on the other hand is brought as the signal $\overline{wI}(S)$ to the actual-value input 1 of the angle controller RW. The phase shifter PH which transforms the field-oriented reference angle value wI(F)* and the stator oriented angle wI(S) into the same reference signal, is integrated here into the comparison stage which is required for forming the control difference for the controller RW.

In FIG. 1 is indicated by dashed lines how the control dynamics of the entire control can be improved further. According to the principle of field orientation, the reference value for the stator current vector is given in a field-oriented coordinate system by reference values for the amplitude and direction and for the field-oriented components, respectively. Any change of the angle wI(F)* between the field oriented reference current vector and the field axis is impressed on the actual stator current of the machine as a corresponding phase change via the converter. In FIG. 1, this is accomplished by the provision that the derivative of the angle wI(F)* which is formed by means of a differentiator DIF is added as a corresponding supplemental frequency fI(F)* to an additional adding stage 4 at the frequency control input 3 of the control unit STW. The field orientation further requires application of positive feedback to the flux angle to the phase of the stator current to be impressed. It is therefore provided in FIG. 1, that the flux computer CAL F determines the derivative in time of the field angle wF(S) as the corresponding field frequency fF(S) and adds it likewise to the additional adder 4.

This arrangement now makes it possible to form at low frequencies an actual value $\overline{wI}(S)$−wF(S) for the angle controller RW and to operate the entire control stably. At higher frequencies, the actual angle value wI(S) already contains no particularly interfering harmonics; in this case the angle follower WIC can be made ineffective and be bridged, as is shown by a corresponding switch SW in FIG. 1.

In FIG. 2, this switch is driven by a threshold transmitter SS which switches the controller RS to the actual-value input 1 of the controller RW as long as the frequency fF(S) or the control variable fI(S)* is below a given limit. If the limit is exceeded, the switch SW is changed to a switch input, to which the actual angle value wI(S) is fed without filtering.

In another variant, the phase shifting device PH is not connected in series with the actual-value input of the angle controller RW directly, but is already integrated at the input of the smoothing stage in the form of a vector rotator VD(−). This case is frequently present in conventional controls in which a reference value Ib* for the active current is taken off at the speed control and the corresponding actual value ib is obtained by means of the vector rotator from the field angle wF(S) and the actual values of the phase currents. FIG. 3 shows the elements used for this purpose, which are supplemented by the smoothing member "WIC".

Since the active current is the component of the current perpendicular to the field axis, the actual value is an angle-like quantity which can be described mathematically by ib =I×sin (wI(F)) with wI(F)- =wI(S)−wF(S). For the pilot control of the servo control RS is not used now the reference value ib* present at the input of the angle controller RW, but a value ib=I ×sin (wI(F)) which is calculated in a multiplying function generator "sin" from the current amplitude I and an angle wI(F)** =wI(S)* − wF(S).

The smoothing stage then furnishes a quantity $\overline{ib}$, where the servo control insures that the difference ib−$\overline{ib}$=I×sin (wI(F))−$\overline{ib}$ becomes 0 in the average.

While this variant furnishes a substitute actual value $\overline{ib}$ which contains harmonics if the multiplier input of the function generator "sin" is taken off at the actual-value input of the controller RI, the range of harmonics of the actual amplitude value I lies in a range which is frequently uncritical for the overall control structure, in contrast to the harmonics of the angle wI(S).

While therefore a "polar control" for the stator referred angle wI(S) is shown in FIG. 2, (the control difference of the angle controller is formed from the polar angle component of the current vector and the smoothing member WIC' smoothes the actual angle value wI(S) of the stator referred current vector), FIG. 3 represents a "Cartesian control" for the field-oriented current vector, since the smoothing member "WIC" smoothes the Cartesian current component ib=I×sin (wI(F)) perpendicular to the flux which takes, as an angle-like value, the place of the load angle wI(F) and is controlled by the angle controller RW to the reference value ib* of this Cartesian field-oriented current component.

However, the control can also be carried out field oriented as in FIG. 3, but polar as in FIG. 2. This is shown in FIG. 4, where the place of the vector rotator VD (−) from FIG. 3 is now taken by the comparator VG at the input of the servo controller RS, and RS now regulates the fed-back angle $\overline{wI}$/ to the mean value of the actual angle wI(F)=wI(S)−wI(F).

The pilot control must by itself then be carried out with the angle wI(F)** =wI(S)* wF(S) from FIG. 3. Since, however, wF(S) changes only slowly as compared to wI(S)*, the addition of wF(S) at the adding stage AD can also be omitted in some applications without appreciably degrading the dynamics of the control.

The invention which is described here by the example of a frequency converter with predetermined input d-c current, can also be applied to other frequency converters which impress a reference value for the phase of the currents by phase control on the stator currents of the rotating-field machine (more generally, on the single-or three-phase currents of a corresponding mode). In addition, it may be necessary also in the case of controls which have in themselves a speed reference setter, to provide a smoothing of the actual phase value which has no adverse effect on the dynamics of the phase control loop.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative other than in a restrictive sense.

What is claimed is:

1. Apparatus for controlling the load angle of a frequency converter with a-c output, especially for supplying a rotating-field machine comprising:
   an angle detector (MW) for forming an actual angle value (wI(S)) for the phase of the frequency converter output currents;
   an angle controller (RW), having an actual-value input (1) connected to the angle detector, and a reference value input (2) having an angle reference value (wI(F)*) coupled thereto;
   a control unit (STW) having a frequency control input (3) connected to an output of the angle controller and having an output signal (fI(S)*) which controls the frequency converter (WR);
   an angle follower (WIC) connected between the angle detector (MW) and the actual-value input (1) of the angle controller (RW) and comprising:
   a servo control (RS) having an integral portion, and a reference value input fed by the actual angle value (wI(S));
   an adding stage (AD) to which are supplied an output signal of the servo control (RS) and an angle pilot control signal (wI(S)*) which is formed from the output signal of the angle controller (RW) and corresponds to the integral of the frequency converter frequency (fI(S)*), an output of the adding stage being connected to an actual-value input of the servo control (RS) and the actual-value input (1) of the angle controller (RW).

2. The apparatus recited in claim 1, further comprising a reference-quantity computer (CAL F), which forms from one of at least one operating quantity of the frequency converter and a load connected to the frequency converter, a reference angle (wF(S)) for the angle reference value and a phase shifter member (PH) responsive to the reference angle and connected in series with one of the actual value and reference value input of the angle controller (RW).

3. The apparatus related in claim 1, further comprising an additional adding stage (AD') arranged between the angle controller (RW) and the control input of the control unit to which a time derivative (fI(F)*) of the angle reference value (wI(F)*) is added.

4. The apparatus recited in claim 1, further comprising a reference-quantity computer which forms the time derivative (fF(S)) of a reference angle for the angle reference value from one of at least one operating quantity of the frequency converter and a load connected to the frequency converter, and an additional adding stage which is arranged between the angle controller and the control input of the control unit to which a time derivative (fI(F)*) of the reference angle (WI(F)*) is fed.

* * * * *